United States Patent [19]

Steele

[11] Patent Number: 4,887,172
[45] Date of Patent: Dec. 12, 1989

[54] APPARATUS AND METHOD FOR CUEING A VIDEO TAPE RECORDER

[75] Inventor: Robert B. Steele, Menlo Park, Calif.

[73] Assignee: Ampex Corporation, Redwood City, Calif.

[21] Appl. No.: 36,630

[22] Filed: Apr. 10, 1987

[51] Int. Cl.[4] .............................................. G11B 15/48
[52] U.S. Cl. .................................. 360/73.06; 360/72.2; 360/72.3; 360/73.08
[58] Field of Search ................................ 360/72.1–72.3, 360/73, 71, 74.1–74.4, 69, 13, 14.1–14.2; 242/186; 226/24, 27, 33

[56] References Cited

U.S. PATENT DOCUMENTS

| | | | |
|---|---|---|---|
| 3,736,565 | 5/1973 | Sidline | 3/72.2 |
| 4,037,260 | 7/1977 | Busby, Jr. et al. | 360/73 |
| 4,062,048 | 12/1977 | Weber | 360/72.2 |
| 4,225,890 | 9/1980 | Takenaka et al. | 360/72.1 |
| 4,267,564 | 5/1981 | Flores | 360/73 |
| 4,411,008 | 10/1983 | d'Alayer de Costemore d'Arc et al. | 360/72.3 |
| 4,692,819 | 9/1987 | Steele | 360/72.1 |
| 4,731,679 | 3/1988 | O'Gwynn et al. | 360/73 |

Primary Examiner—Stuart N. Hecker
Assistant Examiner—David J. Severin
Attorney, Agent, or Firm—Bradley Perkins; George B. Almeida; Richard P. Lange

[57] ABSTRACT

To position a cue location on a video tape to a scanner so that the information stored at the cue location can read by a transducer. The video tape is transported so that when the cue location arrives at the scanner, the tape is moving at a selectable desired velocity. A synchronous cueing function is also provided for, in which the cue location is advanced at the rate of the desired velocity during to cueing operation to allow the positioning to be synchronized with other devices when the cue operation is completed.

26 Claims, 17 Drawing Sheets

APPARATUS AND METHOD FOR CUEING A VIDEO TAPE RECORDER

BACKGROUND OF THE INVENTION

The present invention relates to the cueing, or positioning, of a location on a video tape moved by a tape transport. More particularly, the present invention relates to positioning a cue location on the video tape so that the cue location arrives at its destination with the tape moving at a selectable velocity.

In video production, video tape recorders are used to store video information. Video information is composed of frames of video images. Each frame is in turn composed of two fields of video information. Video information is stored in discrete locations on the video tape. In the commonly used Type C video tape format, each field of video information is stored on the video tape in a helical track. In addition to these tracks of video information, there are other signals recorded on the video tape. These include control track, time code, and audio signals. Control track is typically a periodic signal on the tape used to accurately locate the beginning of each frame of video information.

Video tape recorders perform a number of operations including the playing and recording of video information. To play or record video information, the tape is moved past a scanner, which contains transducers such as a play head, a record head, and an erase head. While the tape moves past the transducers, video information is either read with the play head, written with the record head, or erased with the erase head. The video information is sent to or received from a signal system of the video tape recorder, which interfaces between the video information stored on the video tape and the outside world.

Video tape recorders are used to play and record video information that is stored at specific locations on the video tape. For example, it is common to record a large amount of video information during a video production. Only a small portion of the information is usually needed. The cue function is used to locate the beginning of the portion of needed video information stored on the tape. Similarly, it is often necessary when recording video information to begin recording at a specific location on the tape, for example, following a portion of video information previously recorded. The cue function of a video tape recorder is used to do this positioning of the video tape.

The purpose of the cue function on a video tape recorder is to move a specific location on the video tape to the scanner, so that it can be played, recorded, or erased. This function is also known as the search function. For the purposes of the disclosure, this function will be called the cue function. This location is called the cue location, and the moving of the cue location to the scanner is called cueing. The cue location marks the beginning of a portion of video information to be played, recorded, or erased. This portion of video information might be as short as a field of video information or as long as many thousands of video frames.

The cue function is implemented in present video tape recorders as follows. It is determined whether the cue location lies ahead of or behind the location on the tape presently at the scanner. If it is ahead, the tape transport accelerates the tape in the forward direction. If it is behind the present location, the tape transport accelerates the tape in the reverse direction. As the cue location approaches the scanner, the transports decelerates the tape. Ideally when the cue location reaches the scanner, the tape has been decelerated to a velocity of zero. Less accurate video tape recorders tend to miss the cue location on the first try and have to hop around the location until it is hit.

Actually, arriving at the cue location at zero velocity can waste time because what is often desired is that the tape be moving at the velocity at which the playing or recording is to take place. A disadvantage of the present cue functions is that they can only cue to a zero velocity. Additionally, the transport cannot instantaneously jump the tape from zero to a desired velocity. Thus, the solution in present day recorders is to cue to a location a specific number of frames behind the actual cue location. From that location, the tape is accelerated from a zero velocity to the desired velocity in the distance before the actual cue location is reached. In effect, the transport takes a running start at the actual cue location. There are actually a number of other reasons to choose a location ahead of the actual cue location including allowing time for the various control systems to lock in place, and allowing the operator a visual reference before the cue location.

There is another type of cueing operation that cannot be conveniently executed by present video tape recorders. This function is called synchronous cueing. Synchronous cueing differs from standard cueing in that the cue location changes during the cue operation. In synchronous cueing, the tape is cued to a moving target as the cue location is advanced at the rate of the desired velocity. The advancing cue location simulates a moving reference such as another video tape recorder. Tape movement of the tape recorder is synchronized with this simulated moving reference.

Synchronous cueing can be used to synchronize the playing of video information by one video tape recorder with other video tape recorders or other devices. An example of this would be in a presentation using two or more video tape recorders which must be synchronized. To perform this synchronization with present video tape recorders, the present cue function would be used. After each recorder has been separately cued to the cue location for each recorder, all the recorders would be cued up to play speed. Using this method, time must be allowed for each recorder to cue, before the recorders will be synchronized. While this may be necessary in specific instances, this method is complex and requires that all the tape recorders wait for the last recorder to cue, which potentially may waste a great deal of time.

Therefore, a need exists for a cueing technique in which a cue location can arrive at the scanner, at a desired velocity. There is also a need for a synchronous cueing technique in which the cue location changes during the cue operation at the rate of the desired velocity.

SUMMARY OF THE INVENTION

The present invention provides for a cue function which can position a cue location on a video tape to a scanner at a selectable desired velocity. The present invention provides for a cueing function which can efficiently position the tape to a cue location at a desired velocity without wasting the time to stop in order to cue. Additionally, the present invention provides for a synchronous cue function which can position a cue location on the video tape to the scanner at a selectable desired velocity, in which the cue location is advanced at the rate of the desired velocity.

Using positional information provided from the transport, the location on the tape that is currently at the scanner is determined. Positional information is derived from reading the control track on the video tape, or alternately from tachometer information from the capstan, or both. The cue location that is desired is also determined. This location may be selected by a human operator, or may be calculated from other information. The difference between these two numbers is called the detected distance, and represents the distance and direction the tape must be moved in order to position the cue location at the scanner.

From velocity information, also provided from the transport, the velocity at which the tape is currently moving is determined. Velocity information can be derived from tachometer information from the capstan. The desired velocity of the tape when the cue location reaches the scanner is selected. This velocity may be selected by a human operator, or may be calculated from other information.

For the particular detected distance and selected desired velocity, an intermediate velocity is chosen. The intermediate velocity is the velocity at which the tape is ideally traveling so that when the cue location arrives at the scanner, the tape will be moving at the desired velocity. The intermediate velocity is selected by means of a velocity profile function which is optimized for the mechanical limitations of the tape transport and momentum of the tape and transport. This function limits the rate of change of the intermediate velocities, generated as the cue location approaches the scanner, to the maximum deceleration the transport is capable of.

The intermediate velocity is compared to the velocity the tape is currently moving at, and a velocity error signal is generated. The velocity error signal indicates the difference between the velocity the tape is currently at and the velocity it should be moving at. The velocity error signal is used by the transport to adjust the velocity of the tape to minimize the velocity error signal. The process is continued until the cue location reaches the scanner. When the cue location reaches the scanner, the tape will be moving at the desired velocity thus saving the time necessary in the present cue functions which require a stop and running start.

Synchronous cueing is accomplished by the process described above, with an additional step. Instead of the cue location being a constant, the cue location is advanced at the rate of the selected desired velocity.

Further detailed features of the invention and the manners in which it can accommodate the desired positioning are explained in greater detail hereinafter with reference to the preferred embodiments illustrated in the accompanying drawings.

DETAILED DESCRIPTION OF THE INVENTION

Figure 1:
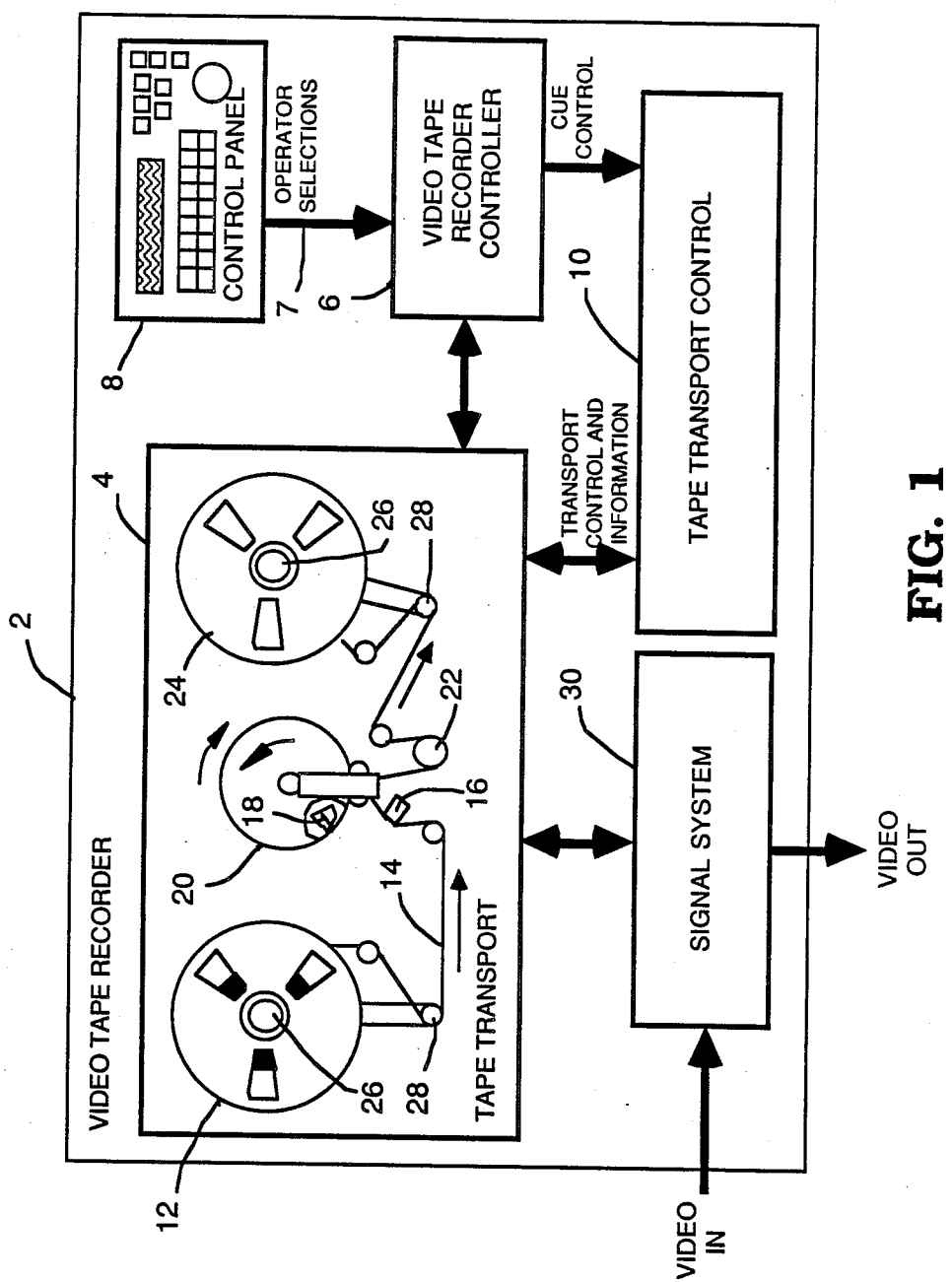
FIG. 1 is a simplified partial block diagram of a video tape recorder.

Referring to FIG. 1, a partial block diagram of a video tape recorder 2 is shown. A video tape transport 4 is used to transport video tape 14 past transducers located along the path of the video tape 14. Video tape transport 4 is of conventional design.

When in a play mode, video tape 14 is fed off a video tape supply reel 12 in the direction indicated. The video tape is then guided into contact with a longitudinal channel transducer 16. Longitudinal transducer 16 can be used to read any longitudinal signal on the tape, such as audio signals, longitudinal time code or control track information. Generally, a video tape recorder will have a number of longitudinal transducers. From longitudinal transducer 16, video tape 14 is guided around scanner 20.

Scanner 20 contains at least one transducer 18 to read video information off video tape 14. Scanner 20 may also include other transducers, such as erase and write transducers. Scanner 20 is of conventional design and rotates in the direction indicated at a fixed, known velocity so as to be able to read helically recorded tracks on video tape 14.

The precise velocity of rotation of scanner 20 and velocity of the video tape 14, at play velocity, vary for different recording formats. However, the values for each format are specified by well known standards. Generally, at normal play speed, the rotation of the scanner 20, and thus transducer 18, is about 100 times the linear velocity of the tape 14.

After leaving scanner 20, video tape 14 is fed into contact with a capstan 22. Capstan 22 is used to regulate the velocity of video tape 14 and is also of conventional design. After leaving capstan 22, video tape 14 is fed onto a take-up reel 24. The transport 4 includes a number of other devices which control the movement of the tape, such as the reel motors 26 and tape tension arms 28. However, in a conventional video tape recorder, these other devices generally track the actions of the capstan 22, which is considered the primary tape motion control. As the exact control of these other devices is well known in the art, this disclosure will limit its discussion to control of tape movement to the capstan.

Tape transport 4 is controlled by tape transport controller 10, which is in turn controlled by video tape recorder controller 6. Recorder controller 6 is conventional and well known to those skilled in the art.

Operation of tape transport 4 is in response to control input signals 7 as interpreted by recorder controller 6 and implemented by tape transport controller 10. Control input signals 7 may originate at a control panel 8 operated by an operator, or may originate from a an outside source through the tape recorder's external interface. These signals specify an operating mode for the tape transport. Recorder controller 6 receives these signals and generates machine control signals that are sent to tape transport controller 10. Tape transport controller 10 interprets these signals and produces the signals necessary to control each element of tape transport 4.

Tape transport controller 10 is composed of two parts. The first part is the conventional transport controller which implements all non-cueing operating modes. A cueing function is one where a specific location on the tape must be positioned to the transducer 18 on the scanner 20. The part of the tape transport controller 10 that implements the non-cueing functions is conventional and well known to those skilled in the art.

The second part of the tape transport controller 10 is the cue system, which embodies the present invention. The cue system is used when a specific location on the video tape 14 must be positioned to the scanner. Once the cue system has accomplished the desired positioning, control is released back to the conventional transport controller.

By controlling the velocity and direction of capstan 22, supply reel 12, and take-up reel 24, a range of tape velocities can be obtained. Tape transport 4 can be operated in the play mode, stop mode, and shuttle mode (including variable play speed mode). In play mode, the direction of the tape is forward and the velocity of video tape 14 is fixed and equal to the velocity normally used to record video information. In stop mode, the video tape velocity is zero, but the scanner 20 is still rotating and video information can be read off tape. Shuttle mode is used to control movement of the tape in either direction and at any velocity. As a practical matter, shuttle velocity is limited to plus or minus 50 times play velocity in even the fastest video tape transports currently being used.

Video information read off video tape 14 is fed to a signal system 30, where it is processed. Video information that is to be recorded is input to the signal system 30. Signal systems for video tape recorders are well known.

Figure 2:
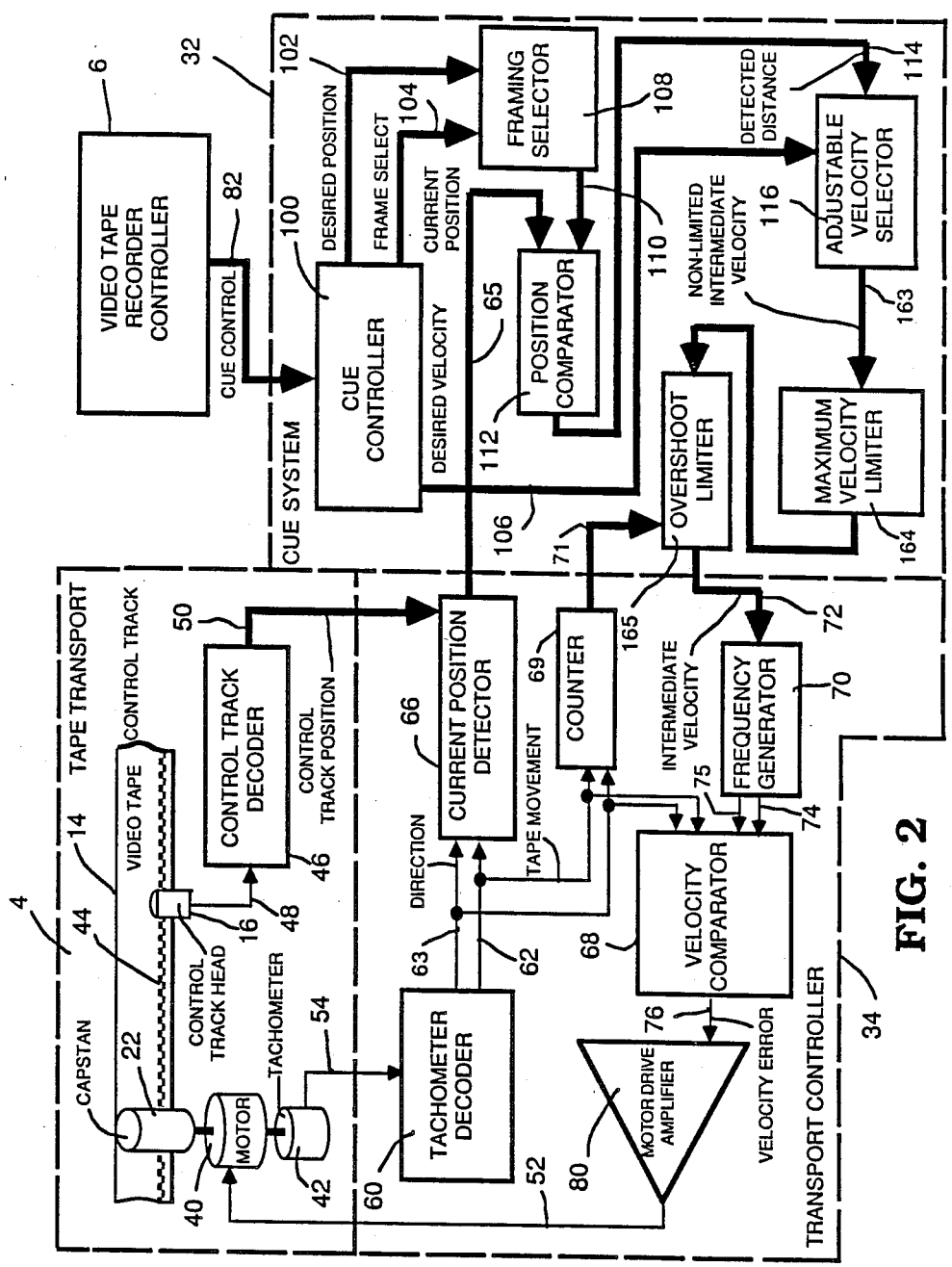
FIG. 2 is a simplified partial block diagram of the video tape recorder.

Referring now to FIG. 2, a partial block diagram of the video tape recorder of FIG. 1 is shown. The elements included in this figure are parts of the video tape transport 4, the video tape recorder controller 6, cue system 32, and parts of transport controller 34.

Referring to tape transport 4, in FIG. 2, video tape 14 is shown in contact with capstan 22 and a control track head 16. Control track head 16 is used to read magnetically recorded control track signals 44. These signals are used to mark the beginning of each frame of video information recorded on video tape 14, and can be used to identify the location of each frame of video information on video tape 14. A control track decoder 46 decodes the control track signal 48 from control track head 16 into a control track position signal 50. Control track position signal 50 indicates the current frame of video information presently located at the scanner 20 (FIG. 1). Because presently used control track signals only occur every frame, particular fields within a frame cannot be identified from the control track signal alone.

Also shown in tape transport 4, is the capstan 22. Capstan 22 is driven by motor 40. The direction and speed of drive motor 40 is controlled by motor control signal 52. Motor control signal 52 is generated by the transport controller 34.

The motion of the capstan 22 is detected by tachometer 42. Ideally, there should be no slip between the capstan 22 and the tape 14, in order for tachometer 42 to accurately detect movement of tape 14. There are a number of capstan designs which are well suited for this task, such as vacuum capstans. A tachometer signal 54 is generated by tachometer 42 and is fed to transport controller 34.

Transport controller 34, parts of which are shown in FIG. 2, has two primary functions. The first is to determine various information about the position and movement of tape 14 on tape transport 4. The second is to control the velocity at which the tape is transported. The position of any particular location on tape can be completely controlled by controlling the velocity of the tape. There are two servo loops used in the cue function. There is an outer loop which includes the cue system 32 and the transport controller 34. There is also an inner loop that includes the tape transport 4 and the transport controller 34. These two loops provide a velocity and positional servo system.

The elements shown in FIG. 2 of the transport controller are only the elements necessary for the discussion of the present invention in the cue system 32. As was discussed above, there are a number of functions of the transport control 34, and there are elements for these functions that are not shown. These elements are well known to those skilled in the art.

Tachometer signals 54 are fed to tachometer decoder 60. Tachometer decoder 60 decodes these signals into a signed tape movement signal 62, and a direction signal 63. The tape movement signal 62 indicates the velocity of tape movement. This signal is fed to current position detector 66 along with direction signal 63. The tape movement signal 62 and direction signal 63 are also fed to a velocity comparator 68. A counter 69 also receives these two signals. Tachometer decoder 60 is of conventional design and is commercially available as an integrated circuit package.

The function of the current position detector is to generate a current position signal 65, which indicates the location on the video tape that is currently at the scanner 20 (FIG. 1). This detector is shown receiving the control track position signal 50 and tape movement signal 62. The information provided by control track position signal 50 is sufficient alone to generate a current position signal 65 that is accurate to a frame of video information. Using this signal, the cue system 32 will only be able to position the tape to within one frame of accuracy. This degree of resolution may be sufficient for many recorders. However, it is desirable to position tape with the resolution of a field of video information. Thus the preferred embodiment of the present invention uses a current position signal with at least field position resolution.

The tape movement signal 62 from the tachometer decoder can be used to augment the resolution of the control track position signal 50. In order to do this, the tachometer 42 must be of higher resolution than the control track 44. Tape movement signal 62 is in the form of a pulse train whose frequency indicates the velocity. Knowing the number of pulses that are generated during the length of each frame, it is possible to determine the position of the tape 14 between the beginning of each frame, as marked by the control track position signal 50, by counting the number of pulses since the beginning of the frame. The current position signal 65, at whatever resolution desired, is fed to the cue system 32.

A complete disclosure of this method of determining tape location by using a combination of control track and capstan tachometer signals can be found in U.S. Pat. No. 4,692,819 entitled Method and Apparatus for Controlling the Position of a Transported Web, issued on Sept. 8, 1987 (this patent issued from an application which is a continuation-in-part of U.S. application Ser. No. 646,619, filed on August 31, 1984, now abandoned), by the present inventor and assigned to the same assignee of the present application. That application is hereby incorporated by reference into the present application.

Counter 69 receives the tape movement signal 62 and the direction signal 63 from the tachometer decoder 60. By counting the pulses in the tape movement signal 62, a velocity signal 71 is generated, where the direction signal 63 determines the sign of the velocity signal 71. The velocity signal 71 indicates the current velocity of the tape and is fed to the cue system 32.

The second function of the transport controller, in its role of the present invention is to control the motor 40, thereby controlling the velocity of the tape 14 by means of the capstan 22. Cue system 32 provides transport controller 34 with an intermediate velocity signal 72. This velocity signal indicates the velocity that the cue system 32 desires the tape 14 to presently be moving at. Intermediate velocity 72 is converted to the same form as velocity signal 62. Frequency generator 70 performs this task. Frequency generator is of conventional design and can easily be constructed by those skilled in the art.

The output of the frequency generator 70 is a motion signal 74 and a direction signal 75, and is fed to velocity comparator 68 which compares tape motion signal 62 and direction signal 63, indicating the current velocity of the tape 14, with motion signal 74 and direction signal 75, indicating presently desired velocity. The result of this comparison is the difference between the current velocity of tape 14, and the velocity presently desired by the cue system. This difference is represented by a velocity error signal 76. Velocity comparator 68 is of conventional design.

The velocity error signal 76 is fed to a motor drive amplifier 80. Motor drive amplifier 80 generates the motor drive signal 52 and thereby adjusts the velocity of the tape 14 to minimize the velocity error signal 76. Motor drive amplifiers are well known to those skilled in the art.

Cue system 32 receives the current position signal 65 and current velocity signal 71 from transport controller 34, and a cue control signal 82 from recorder controller 6. Cue control signal 82 specifies the desired position at which the tape is to be cued, the desired velocity and direction the tape should be moving when cued, and framing requirements, if any. These parameters can be derived from operator input at the control panel 8, or can be derived from a control signal provided by a source external to the video recorder through an external input interface.

A cue controller 100 receives the cue control signal 82 and generates a desired position signal 102, a frame select signal 104, and a desired velocity signal 106. The desired position signal 102 indicates the desired cue location, that is, the location on the tape that is to be positioned at the scanner 20 (FIG. 1). The desired velocity signal 106 indicates the desired velocity at which the tape 14 is to be moving when the desired cue location reaches the scanner 20 (FIG. 1). The frame select signal 104 indicates whether a particular type of frame lock is desired.

Framing selector 108 receives the desired position signal 102 and frame select signal 104. It generates a framed desired position signal 110. To perform the standard cueing operations that have been discussed, framing selector 108 may be omitted from the cue system 32.

There are several desirable play modes for a video tape recorder. One mode is the non-framed play mode. This mode simply requires the tape 14 to be moving at the standard play speed without regard to synchronization to any particular location on the tape 14 with any reference signal. This function can be executed by the tape transport control 10 (FIG. 1), without the assistance of cue system 32.

A second play mode is the framed play mode. The requirement of this play mode is that positioning of the beginning of a frame at the scanner 20 (FIG. 1) is synchronized to a reference signal. This is a variation on the standard cue function in that instead of one particular cue location, the beginning of any frame is a potential cue location.

The third play mode is the color framed play mode. Depending on the television standard, the phase of the color information in the video signal changes from field to field, and from frame to frame. It takes a certain number of frames before the color phase repeats. For example, in the NTSC television standard, the color phase repeats every two frames, and in the PAL standard, it repeats every four frames. In certain situations it can be very desirable to synchronize the play mode at the beginning of a color frame sequence with a reference signal.

To provide these framed play modes, the framing selector 108 takes the modulus of the desired position 102, with the frame select 104 being the modulo. Restated, the desired position 102, which must be selected to be the beginning of a frame or color frame sequence, is divided by the frame select value 104, which must be chosen to be the length of the frame or color frame sequence, and the remainder is produced as the framed desired position signal 110. The framing selector 108 can easily be implemented as a digital divider with remainder output. When framing is not desired, the frame select signal 104 is set to a large number, such as the length of the tape, and the remainder produced will be the desired position signal 110.

The framed desired position signal 110 is fed to a position comparator 112. Position comparator 112 also receives the current position signal 65. Position comparator calculates the difference between these two positions by subtracting the framed desired position signal 110 from current position signal 65, and generates a detected distance signal 114, which indicates the distance between the desired position and the current position. The sign of the detected distance signal 114 indicates which direction the desired position is from the current position. Position comparator 112 can be implemented as a digital subtractor.

The detected distance signal 114 is fed to an adjustable velocity selector 116. The adjustable velocity selector 116 also receives the desired velocity signal 106. From these two signals, adjustable velocity selector 116 initiates the generation of the intermediate velocity signal 72 of previous mention.

The adjustable velocity selector 116 implements a function, which for any particular detected distance signal 114 and desired velocity signal 106, generates an intermediate velocity, which is the velocity at which the tape 14 should presently be traveling in order for the cue position to reach the scanner at the desired velocity represented by signal 106. This function can take many forms, as will be discussed below, but must generate the desired velocity signal 106 in the form of the intermediate velocity 163 when the detected distance signal 114 is zero. This should not be considered a limitation on this function, but rather is the purpose of the function. That is, when the detected distance is zero, indicating the cue location on the tape 14 has arrived at the scanner 20 (FIG. 1), the velocity of the tape 14, as dictated by the intermediate velocity signal 72, should be at the desired velocity of signal 106.

Figure 3:
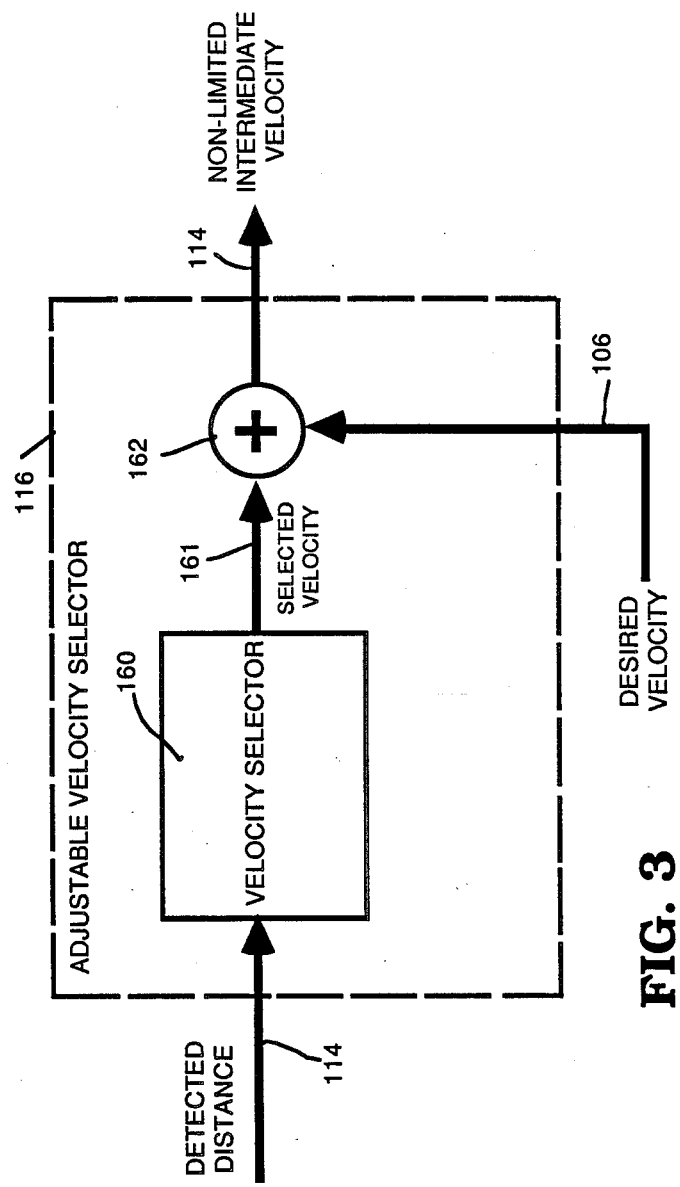
FIG. 3 is a simplified block diagram of the adjustable velocity selector of FIG. 2.

Referring to FIG. 3, a block diagram of the adjustable velocity selector 116 is shown. The detected distance signal 114 is fed to a velocity selector 160. Velocity selector 160 generates a selected velocity signal 161 in response to the detected distance, which is the velocity at which the tape 14 should presently be transported in order for the cue location to reach the scanner at a velocity of zero. This function must generate a selected velocity and signal 161 of zero when the detected distance signal 114 is zero. Functionally, for any detected distance 114, velocity selector 160 selects a selected velocity signal 161. Velocity selector 160 can be implemented as a look-up table of previously calculated values, or can be implemented as a mathematical function that is calculated for each value of the detected distance. Details of the velocity selector 160 will be discussed below.

The selected velocity signal 161 from velocity selector 160 is fed to adder 162. Also fed to adder 162 is the desired velocity signal 106. These two signals are added by adder 162 to generate a non-limited intermediate velocity signal 163. Adder 162 can be implemented as a digital adder.

Referring back to FIG. 2, the non-limited intermediate velocity signal 163 is fed to a maximum velocity limiter 164. The function of maximum velocity limiter 164 is to limit the intermediate velocity to the maximum velocity the transport 4 is capable of. This may not be necessary, and would not be needed where the transport's capabilities are greater than the expected intermediate velocities.

The output of maximum velocity limiter 164 is fed to overshoot limiter 165. The function of overshoot limiter 165 is to limit the non-limited intermediate velocity signal 161 so as to prevent an overshoot of the desired position because of inability of the transport 4 to instantaneously change velocity. If this ability is also not be required, this element could be eliminated. Overshoot limiter 165 receives the output of the maximum velocity limiter 164 and the current velocity signal 71 from the counter 69. The function of overshoot limiter 165 will be described below. Such limiters are well known to those skilled in the art. The output of overshoot limiter 165 is the intermediate velocity signal 72.

Figure 4:
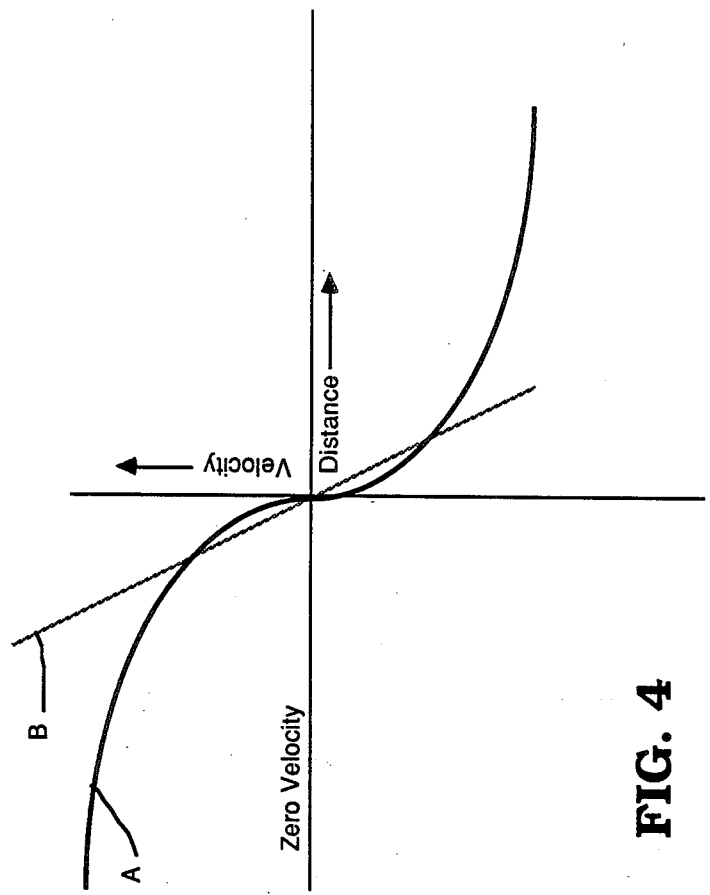
FIG. 4 is a graph representing two detected distance/intermediate velocity functions.

Referring now to FIG. 4, a graph of the function implemented by velocity selector 160 (FIG. 3) is shown. There are a limitless number of functions that meet the sole requirement that a detected distance of zero must yield a selected velocity of zero. For example, a linear function might be used. Such functions are common called velocity profiles by those skilled in the art. The design of a velocity profile is tailored to mechanical limitations of the tape, the potential amount of tape packed on the tape reels, and the transport. There are also ballistic considerations relating to the same elements. Creating a velocity profile based on these considerations is well known to those skilled in the art.

The preferred velocity profile for the present invention is composed of two velocity profiles. The first velocity profile is the square root function of the form velocity equals a constant multiplied by the square root of the detected distance. The constant can be determined from mechanical and ballistic parameters. The differential of this function forms an indication of acceleration, which should reflect the maximum acceleration the transport is capable of for any particular velocity.

A graph of this function is shown in FIG. 4. The vertical axis is velocity and the horizontal axis is distance. Line A represents the square root function. The origin point of the axis is zero velocity and zero distance. This function would be implemented by velocity selector 160 such that for a detected distance, a selected velocity could be read off the graph. For a negative detected distance, indicating the cue location is ahead of the current position, a positive selected velocity would be chosen, causing the tape to be transported forward. For a positive detected distance, indicating the cue location is behind the current position, a negative selected velocity would be chosen, causing the tape to be transported in reverse.

The use of the square root curve for a velocity profile is well known to those skilled in the art, and is commonly used for this purpose. There is a problem, however, in using the square root curve. As the curve approaches its zero crossing, its slope, that is the acceleration, approaches infinity. This requires that the transport 4 be capable of infinite acceleration or deceleration, which is unfortunately not possible. The maximum acceleration for the transport can be determined. Line B on the graph has a slope which is the maximum acceleration of transport 4. The selected velocity should not be greater than the values allowed by this line. Thus, where curve A would produce a greater selected velocity than line B would, the selected velocity should be produced by line B. This creates a composite function, shown as composite curve C which is shown in FIG. 5.

Composite curve C should be selected to be less than the maximum curve the transport can handle. This difference provides headroom for the transport so that when a velocity is overshot, the servo system remains in control. If this was not done, the servo system would saturate when a velocity is over the curve C, and control would be lost until the velocity returns under the curve.

Figure 5:
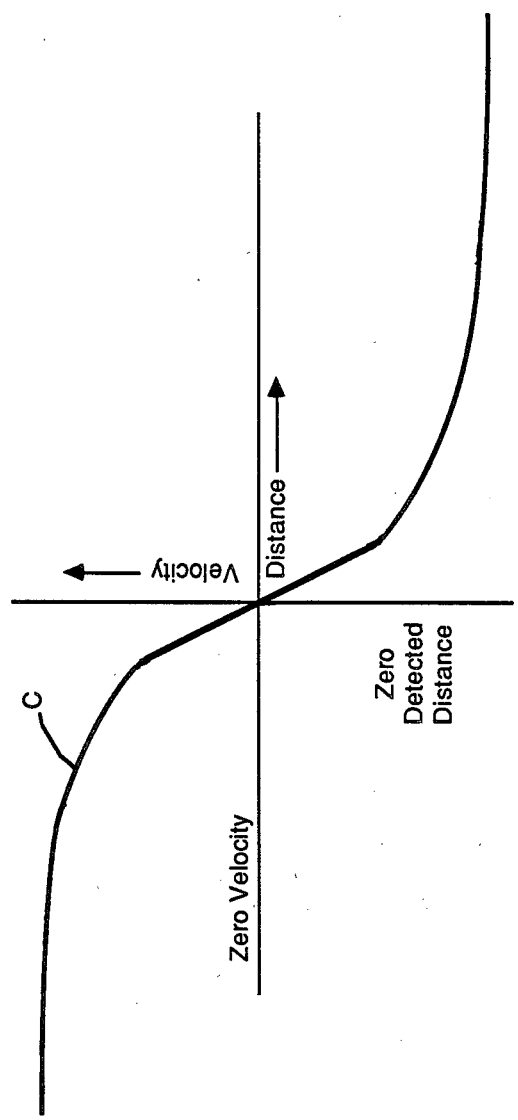
FIG. 5 is a graph representing a composite detected distance/intermediate velocity function.
Figure 6:
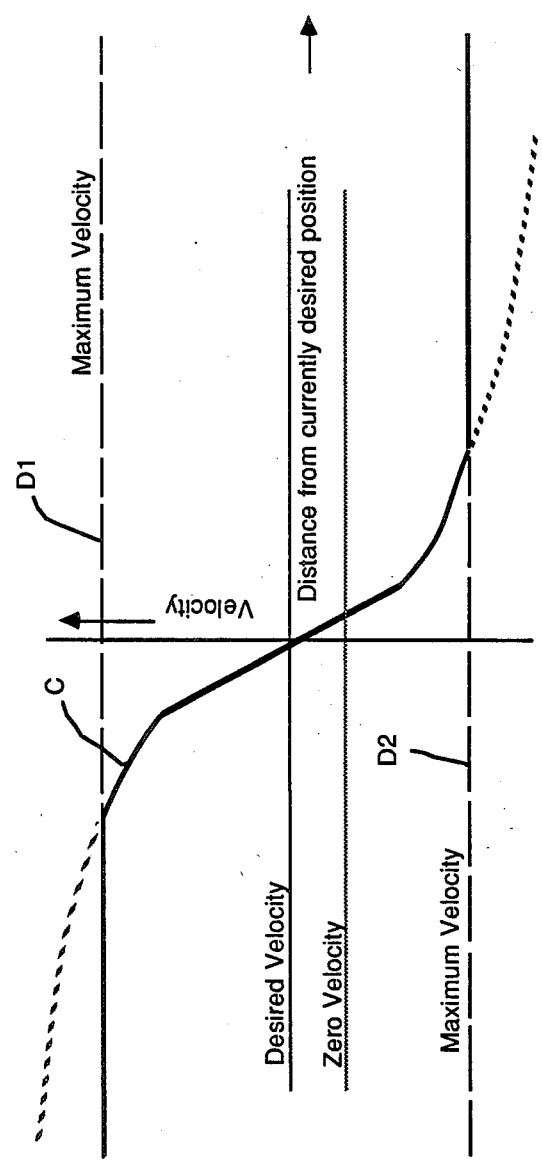
FIG. 6 is a graph representing the composite detected distance/intermediate velocity function adjusted for a desired velocity.

Whereas FIG. 5 shows the range of outputs from velocity selector 160, FIG. 6 shows the range of outputs from adjustable velocity selector 116 for a particular desired velocity. As can be seen, the effect of adder 162 is to shift the composite curve C upward on the velocity axis by the amount of the desired velocity. It should be noted that the center point of composition curve C, when the detected distance is zero, is now at the desired velocity, rather than zero velocity. Restated, for a given detected distance of zero, the intermediate velocity generated from an implementation of composite curve C is the desired velocity. This is exactly the requirement stated for adjustable velocity selector 116, discussed above.

Also shown in FIG. 6 is the effect of maximum velocity limiter 164, which is to limit the selected velocity to the maximum velocity the transport 4 is capable of. Line D1 indicates the maximum forward velocity, and Line D2 indicates the maximum reverse velocity.

Figure 7:
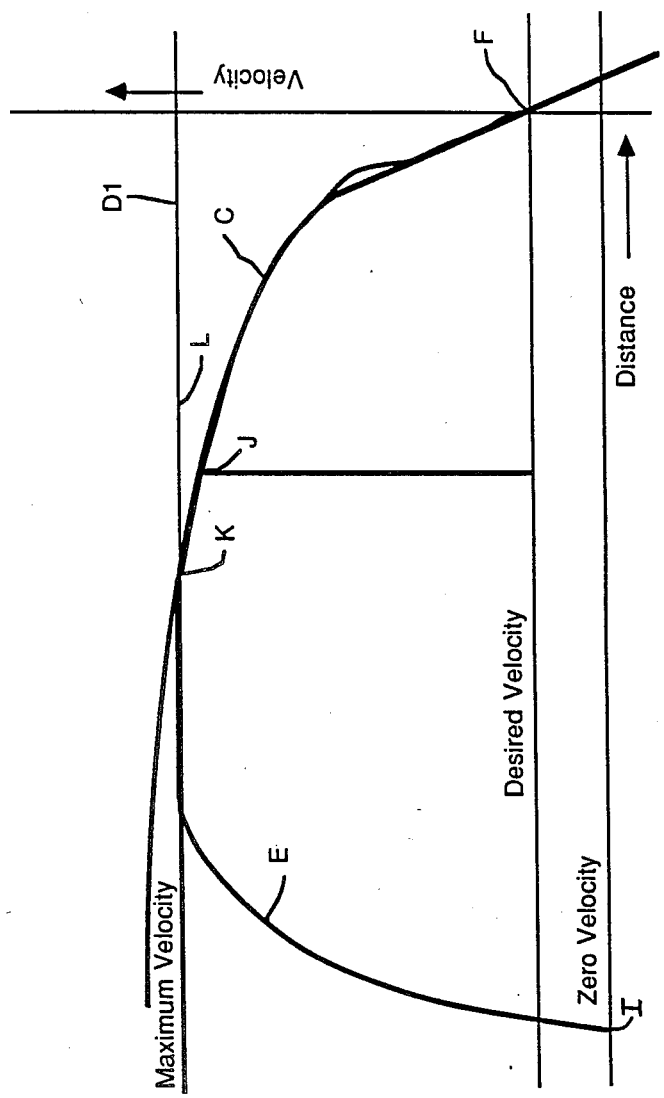
FIG. 7 is a graph representing a composite detected distance/intermediate velocity function adjusted for a desired velocity illustrating a cueing operation.

FIG. 7 is a graph of a simple cueing operation. Only the left hand side of the previous graphs is shown. Composite curve C is shown intersecting with the distance and velocity origin at point F. This point represents the desired position and the desired velocity. The current position of the cue location and current velocity of the tape are shown on the graph as point I, which indicates a current velocity of zero. For the detected distance, which is the distance on the graph between point I and point F on the distance axis, an intermediate velocity is selected, whose value is indicated by point J. Because of the forces of inertia and momentum, the transport cannot instantaneously implement the intermediate velocity and the current velocity distance curve, shown as curve E, does not track the composite curve immediately.

As the detected distance is reduced, inertia is overcome by the transport and the current velocity increases to meet the intermediate velocity curve. When the current velocity equals the intermediate velocity, at point K, momentum carries the current velocity above the intermediate velocity. As the detected distance is further reduced, momentum is overcome by the transport and the current velocity decreases to meet the intermediate velocity curve. Depending on the abilities of the transport 4 (FIGS. 1 and 2), the current velocity curve E may only approximate the composite curve C as the detected distance reaches zero and the current velocity reaches the desired velocity at point F, however curve C is selected so that curve E can follow curve C with only some small difference.

Figure 8:
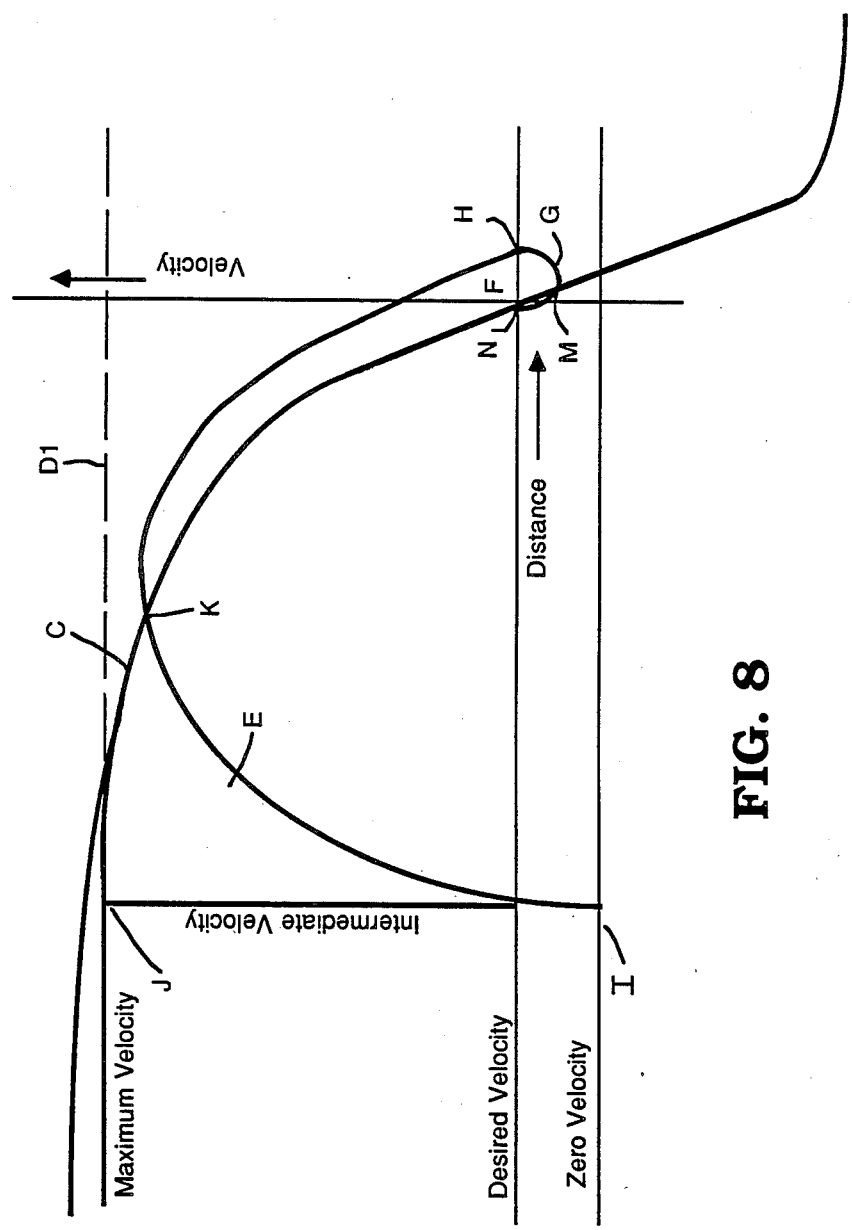
FIG. 8 is graph representing a composite detected distance/intermediate velocity function adjusted for a desired velocity illustrating an overshoot in a cueing operation.

As was discussed above, the function of overshoot limiter 165 is to limit the selected velocity so as to prevent overshoot. An example of this problem is shown in the graph of FIG. 8. Composite curve C is shown intersecting with the distance and velocity origin at point F. This point represents the desired position of the cue location and the desired velocity. The current position and velocity is shown on the graph as point I, which indicates a current velocity of zero. For the detected distance, which is distance on the graph between point I and point F on the distance axis, an intermediate velocity is selected, whose value is indicated by point J. Once again, because of the forces of inertia and momentum, the transport cannot instantaneously implement the intermediate velocity, the current velocity/distance curve, shown as curve E, does not track the composite curve C.

As the detected distance is reduced, inertia is overcome by the transport 4 and the current velocity increases to meet the intermediate velocity curve. When the current velocity equals the intermediate velocity at point K, the momentum of the transport causes it to overshoot the composite velocity curve C. Because the detected distance is shorter than in the previous example, there is insufficient distance for the transport to overcome the momentum before reaching a detected distance of zero. Thus, the transport overshoots the desired velocity at the detected distance of zero and must reverse direction and come back as shown through points H, G, M and N to reach point F. This is not necessarily a problem, as the cue location is eventually reached. The only real problem is that this method is inefficient and wastes time.

Figure 9:
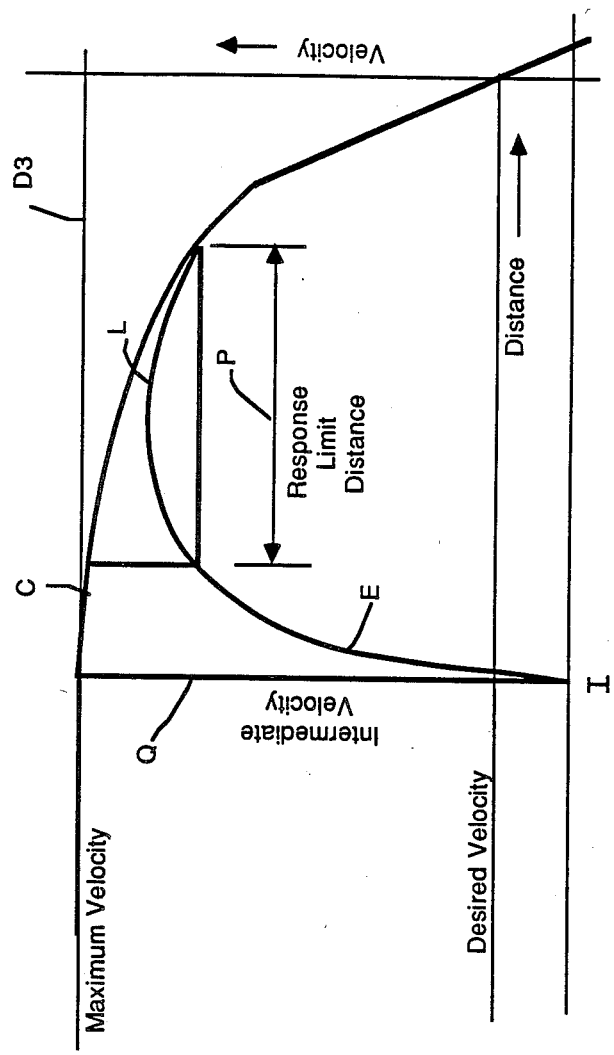
FIG. 9 is graph representing a composite detected distance/intermediate velocity function adjusted for a desired velocity illustrating overshoot limiting in a cueing operation.

This problem can be overcome as shown in the graph of FIG. 9. Overshoot limiter 165 performs a calculation to determine, for any given current velocity, the distance necessary to overcome momentum and return to that current velocity if the intermediate velocity is held to that particular current velocity. This calculation is based on the assumption that the transport has a fixed known acceleration, which is generally the case when the servo system is locked to the capstan. This would not be the case where the tape transport is limited by the reel servo system. This distance, the response limit distance, is indicated with line P for the particular current velocity shown. The response limit distance is subtracted from the detected distance. This is called the response limit difference.

A velocity is selected for the response limit difference, in the same manner as a velocity is selected for the detected distance. If the non-limited intermediate velocity is equal to or greater than this response limit velocity, then momentum will carry the velocity of the transport beyond the curve C and an overshoot will occur. Thus, when the non-limited intermediate velocity is equal to or greater than the response limit velocity, overshoot limiter 165 limits the non-limited intermediate velocity to the current velocity to prevent overshoot. The output of overshoot limiter 165 is the intermediate velocity signal 72.

Figure 10:
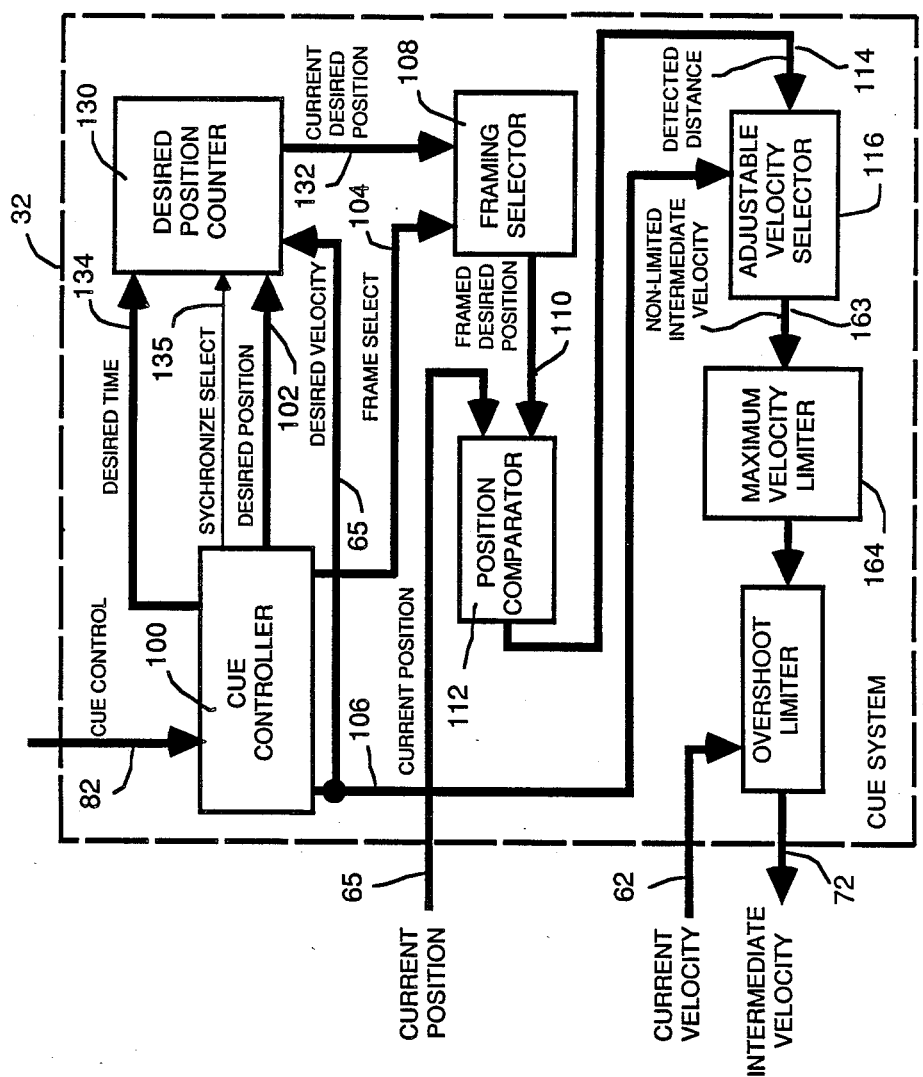
FIG. 10 is a simplified block diagram of an alternate embodiment for the cue system of FIG. 2.

Referring now to FIG. 10, the cue system 32 is shown with the addition of a desired position counter 130. This cue system 32 functions identically with the cue system 32 discussed in FIG. 2 with the exception that the desired position now is advanced at the rate of the desired velocity by a new element, the desired position counter 130. This provides a synchronous cueing ability that will be discussed below.

Instead of the desired position signal 102 being fed directly to the framing selector 108, it is first fed to desired position counter 130. There are three other signals which are fed to desired position counter 130. These are a desired time signal 134, which specifies the point in time at which the synchronization is to take place, a synchronize select signal 135, which enables the synchronization, and the desired velocity 106, which is used by the desired position counter 130 to provide the rate the desired position is to be advanced. These signals are provided by the cue controller 100 from the cue control signal 82 it receives. The output of desired position counter 130 is fed to the framing selector 108 as current desired position signal 132. From this point, the current desired position signal is treated just as the desired position signal in the cue system 32 of FIG. 2.

Figure 11:
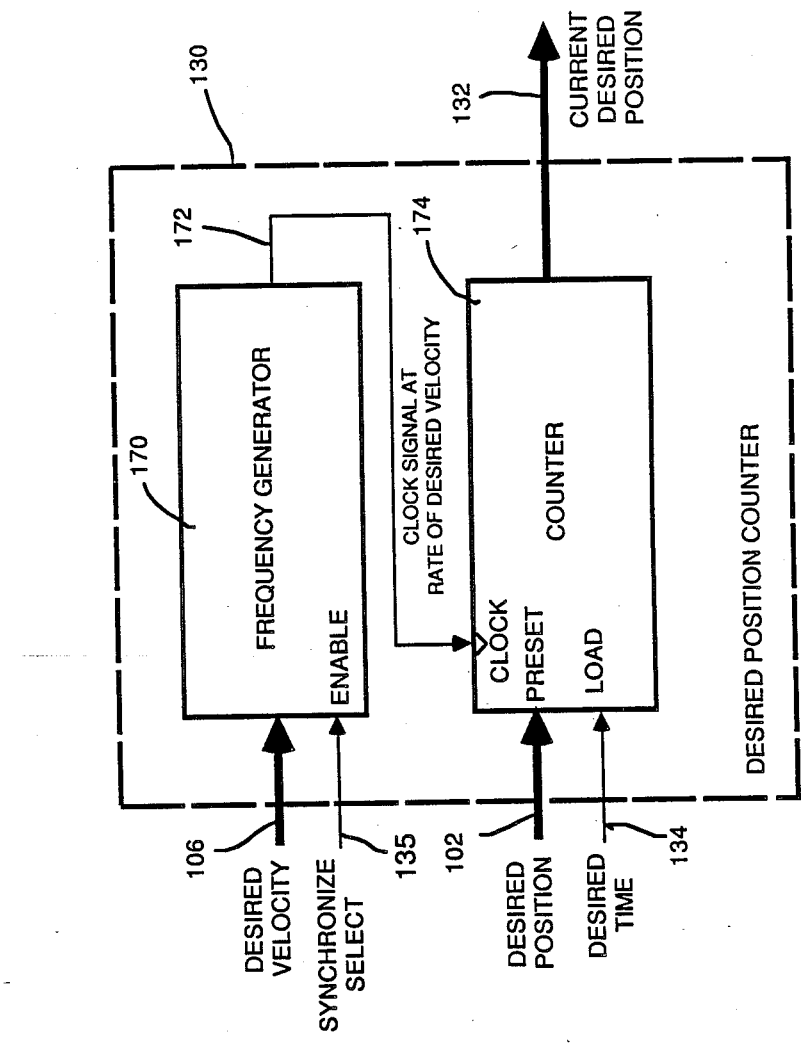
FIG. 11 is a simplified block diagram of the desired position counter of FIG. 9.

Referring to FIG. 11, an implementation of the desired position counter 130 is shown. The desired velocity is fed to a frequency generator 170, which produces a period clock signal 172 which has a frequency at the rate of the desired velocity. The frequency generator 170 is enabled by the synchronize select signal 135. If synchronization is selected, the frequency generator 170 is enabled. Frequency generators are well known to those skilled in the art.

Clock signal 172 is fed to a counter 174 which uses this signal as its clock signal. Counter 174 is preset with the desired position signal 102 when the desired time signal 134 is active. The output of the counter 174 is the current desired position signal 132.

In operation, the desired velocity signal is provided to frequency generator 170. The desired position signal 102 is provided to the preset of counter 174. At the point in time from which the desired position is to be advanced, the desired time signal 134 is activated and counter 174 presets with the desired position signal 102. At the same time, the synchronize select 135 is activated and frequency generator 170 is enabled. The counter now increments the original desired position 102 at the rate of the desired velocity. This allows the synchronous cueing operation.

In the standard cueing operation, the tape is cued to a fixed desired position. In synchronous cueing, the tape is positioned to a moving target. The advancing desired position simulates a moving reference such as another video tape recorder. It is this simulated moving reference that tape movement is synchronized with.

For example, it is desired that a cue location, frame 3000, on the tape be at the scanner, moving at play speed, at the present time. Instead, frame 1000 is at the scanner and the tape is moving in high speed shuttle. Obviously it is not possible to instantaneously obtain the desired goal, and it will take a certain amount of time to arrive at frame 3000. Thus when we arrive at frame 3000 it will no longer be at the original present time, but rather the original present time plus the time it took to position the tape. If the tape had been at the desired frame 3000 at play speed at the original present time, the tape would have moved a certain distance during the positioning time, and thus the tape should be at frame 3000 plus the number of frames that would have been moved during this period, which might be frame 3400.

The solution to this problem is to advance the desired position at the rate of the desired velocity, so that when the desired position arrives at the scanner at the desired velocity, the time it took to get there is compensated for. This is the synchronous cueing function.

There are a number of uses for this function, including synchronizing several video tape recorders, however there is a particularly useful application for this ability. This application is in frame locking that has been discussed above. Using the cue system 32, of FIG. 10, with the synchronous cueing ability, the desired position moves allowing accurate frame locking.

Figure 12:
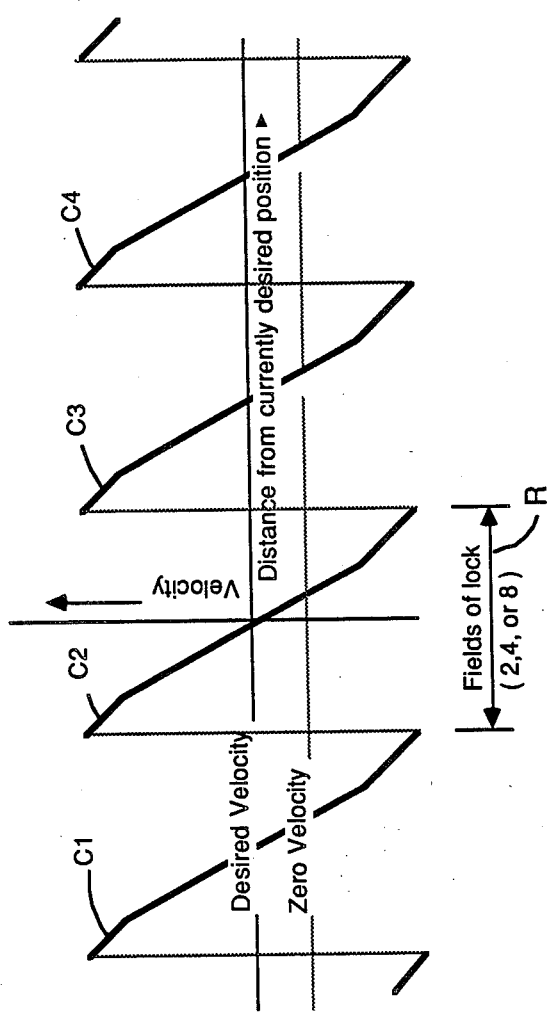
FIG. 12 is a graph representing a composite detected distance/intermediate velocity function adjusted for a desired velocity in a frame select mode.

Referring now to FIG. 12, the graph shown is a representation of the effect of the framing selector 108 used in combination with synchronous cueing. Line R is representative of the distance specified by the frame select signal 104. This distance is selected according to which type of frame lock is desired. For example, for a simple frame lock, the distance chosen is two fields, or one frame. For an NTSC color lock, a distance of four fields is chosen, and for a PAL color lock, a distance of eight fields is chosen. While only one curve, curve C1, is used to select the intermediate velocity, the net effect of framing selector 108 is to create a number of velocity distance curves, shown as C1 through C4 over the distance the tape travels.

Figure 13:
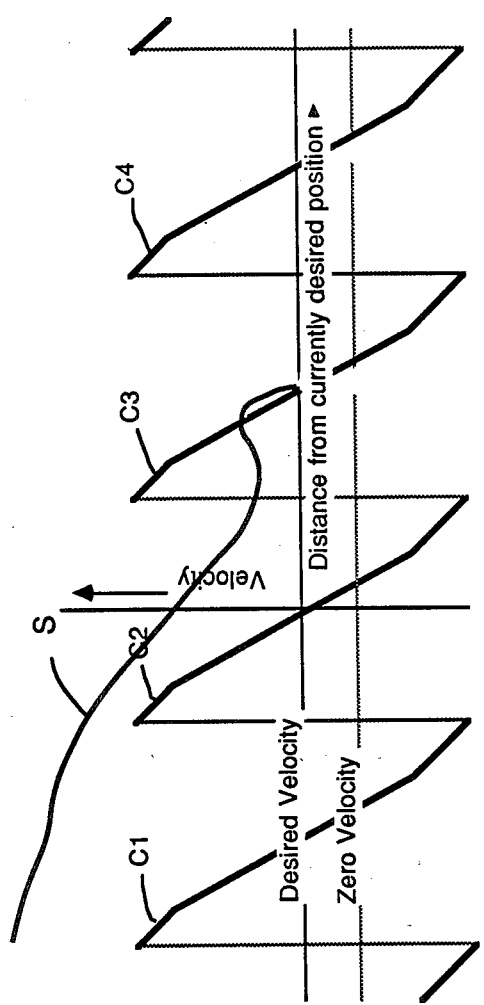
FIG. 13 is a graph representing a composite detected distance/intermediate velocity function adjusted for a desired velocity in a frame select mode illustrating a cue function in a frame select mode.

FIG. 13 illustrates a path that the velocity of the tape might take as the transport obtains a frame lock from high speed shuttle. Curve S indicates the change in velocity and distance of the tape. Coming from high speed shuttle on the upper left portion of the Curve S, intermediate velocities are selected first from curve C1. Curve C1 has little direct effect on curve S because the current velocity is much greater than intermediate velocity. When curve C1 is overshot, intermediate velocities are selected from curve C2. Because curve S is closer to curve C2, an effect on its path can be seen as curve S attempts to follow curve C2. When curve S overshoots curve C2, intermediate velocities are selected from curve C3. Curve C3 is followed by curve S and the tape is frame locked when it reaches the desired velocity.

Figure 14:
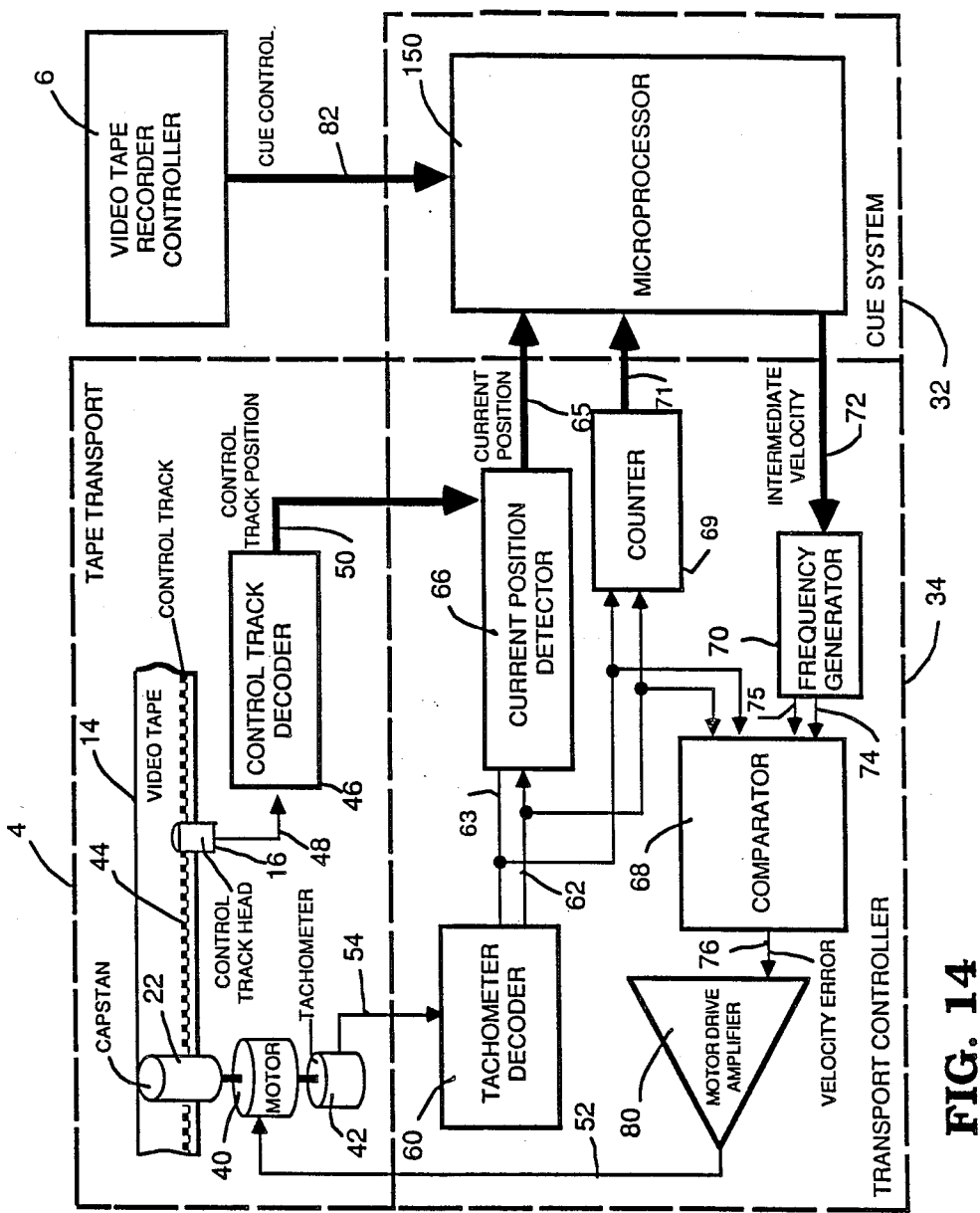
FIG. 14 is a simplified block diagram of preferred embodiment for the cue system of FIGS. 2 and 9.

While the present invention has been described in terms of discrete components, in which it is easily implemented, the preferred implementation is in computer software executed by a microprocessor 150, as illustrated in FIG. 14. The discrete elements of the cue controller are replaced by a microprocessor, although any computing apparatus could be used. The preferred microprocessor is a Motorola 68000 microprocessor, and the software is preferably written in the C programming language.

Microprocessor 150 receives the cue control information 82, the current position signal 65, and the velocity signal 71. It outputs the intermediate velocity signal 72. The program executed by microprocessor 150 is illustrated by the logic diagrams in FIGS. 15, 16 and 17.

Figure 15:
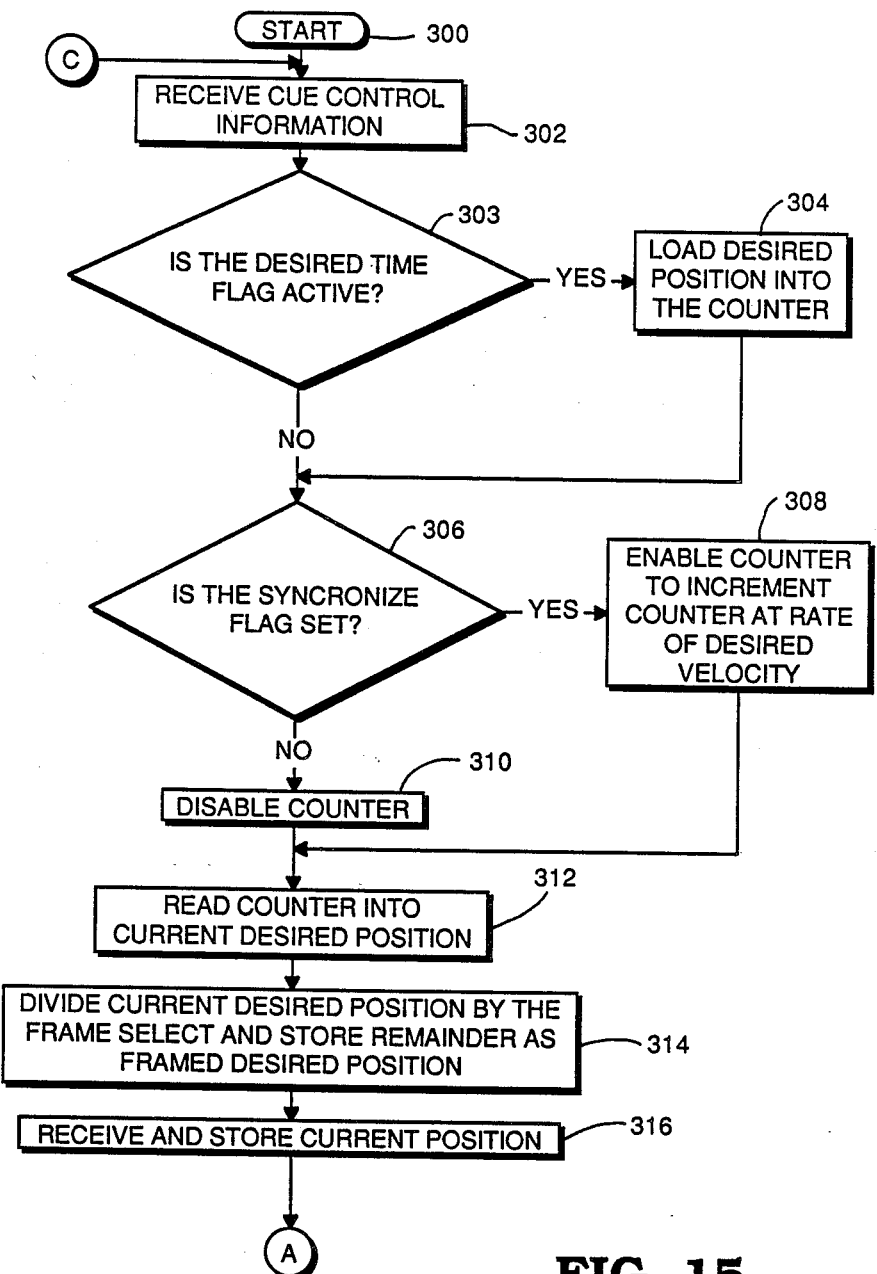
FIG. 15 is a simplified flow chart of the software implemented by the cue controller of FIG. 14.

Referring now to the logic diagram in FIG. 15, the program begins at start block 300. The first step is represented by block 302, in which the cue information is received and decoded into a desired position variable, a desired velocity variable, a frame select variable, a desired time flag, and a synchronize select flag.

After the decoding block 302, the status of the desired time flag is checked in block 303. If it is active, then block 304 is branched to. If it is not active, block 306 is branched to. The desired time flag indicates the point in time at which synchronization is to start. In block 304, which is branched to if the desired time flag is active, the desired position variable is loaded into a desired position counter procedure. From block 304, block 306 is executed.

In block 306 the status of the synchronize select is checked. This flag indicates whether synchronization is desired. If it is desired, then the flag will be active. If it is active, then block 308 is executed. In block 308, the desired position counter procedure is enabled to increment the desired position variable at a rate specified by the desired velocity variable. The effect of this procedure is to advance the desired position at the rate of the desired velocity. This counter procedure continues to increment the desired position variable until it is disabled by inactivating the synchronize select flag. The next block executed is block 312.

Back in block 306, if the synchronize select flag is inactive, then block 310 is executed. In block 310, the desired position counter procedure is disabled. The next block executed is block 312.

The desired position variable is read and stored in a current desired position variable in block 314. This is done because desired position variable might be changing during the execution of this program, which would give inaccurate results. The effect copying the desired position into the desired position variable is to freeze its value.

Next, in block 314, the current desired position variable is divided by the frame select variable. The remainder is loaded into a framed desired position variable. This operation is used to implement the frame select procedure discussed above. The length of the frame selection desired is chosen as the frame select value. If not frame select is desired, the frame select value is chosen to be a number larger than the current desired position, such as the length of the tape. When the frame select number is larger than the current desired position, the current desired position is the remainder.

The next block executed is block 316, in which the current position is received and stored into a current position variable. In the next block, block 318 of FIG. 16, the difference between the current position variable, and the framed desired position is calculated. This difference is stored in a detected distance variable. This is the distance between the current position and desired position, and is the distance the tape must be moved to position it.

The next block is block 320. In this block, a velocity value is selected for the detected distance. Preferably, this selection is done according to the velocity/distance profile discussed with regard to FIGS. 4 through 6. Whatever function is implemented, it can be executed in a number of ways. One method is a pre-calculated table of values, that is used as a look-up table. In the preferred embodiment, the calculation is made according to the composite function discussed. If the detected distance is in the linear range of the function, the linear function is used. If the detected distance is outside the linear range, the square root function is used. The selected velocity is stored in a selected velocity variable.

Next, in block 322, the selected velocity variable is added to the desired velocity variable and the result is stored in a non-limited distance variable. The purpose of this operation is to add the offset of the desired velocity to the selected velocity, so that when the detected distance reaches zero, the current velocity is the desired velocity.

Figure 16:
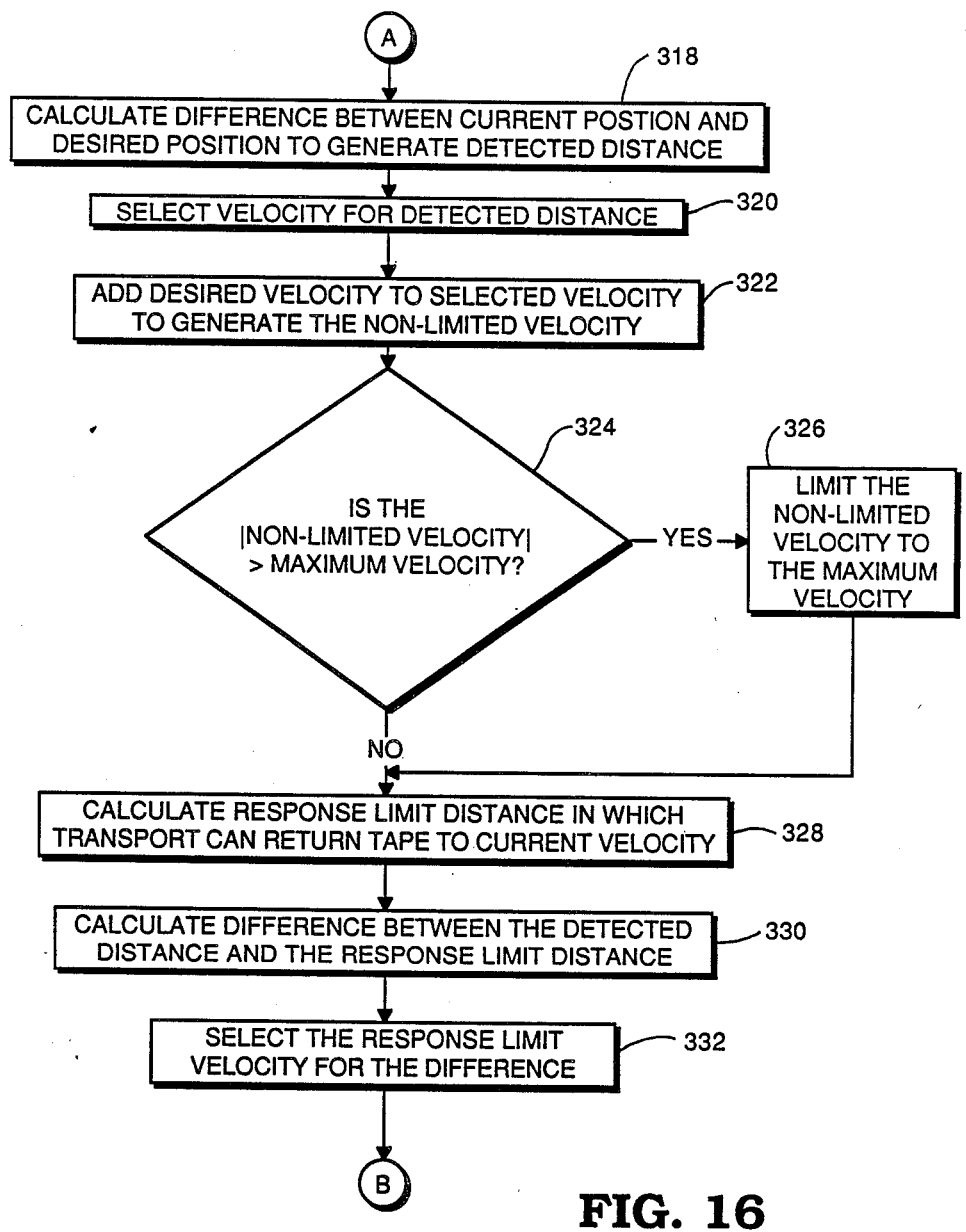
FIG. 16 is a continuation of the flow chart of the software implemented by the cue controller of FIG. 14.
Figure 17:
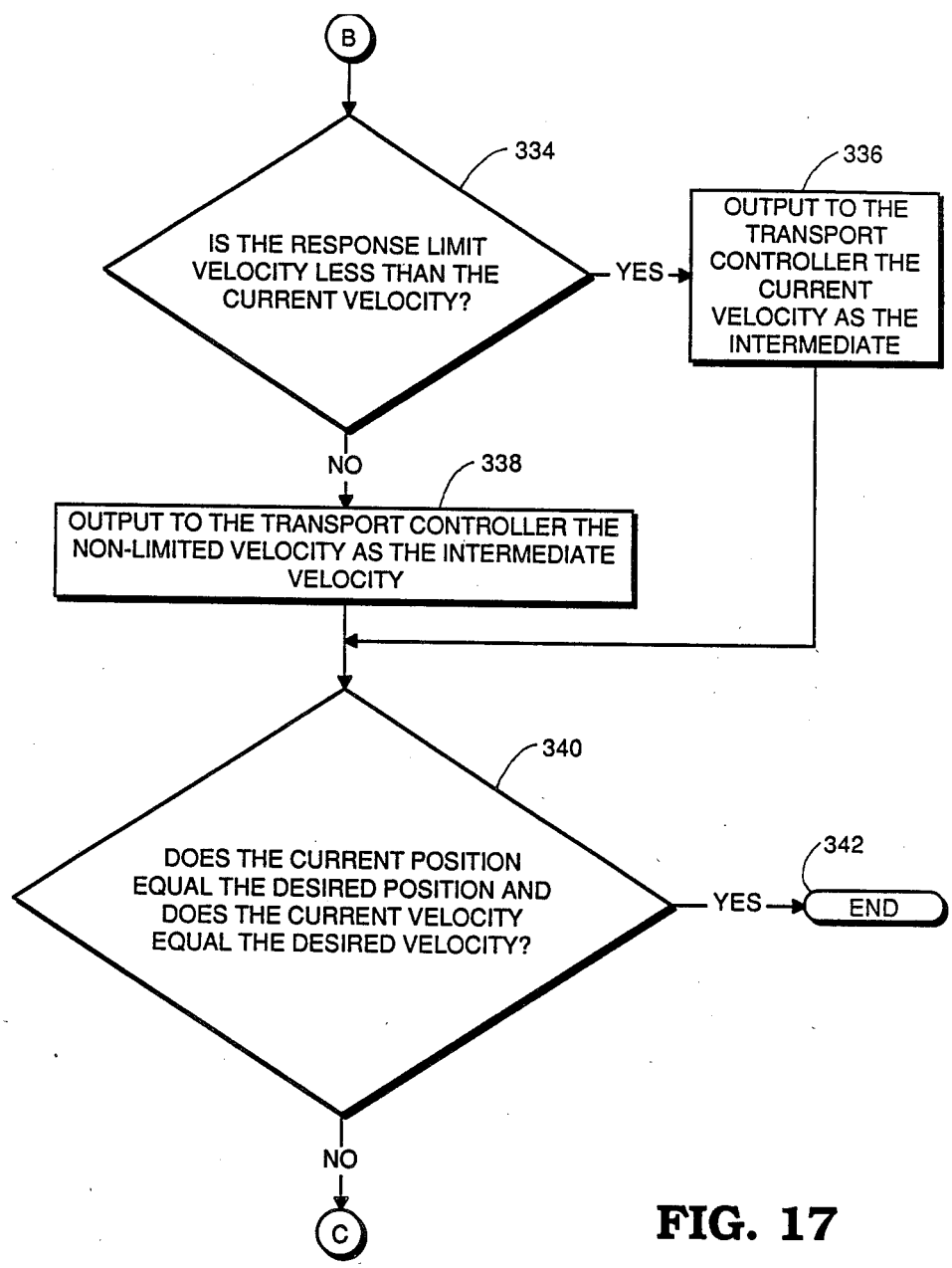
FIG. 17 is a continuation of the flow chart of the software implemented by the cue controller of FIG. 14.

The next block executed is on FIG. 16, and it is labeled 324. The absolute value of the non-limited velocity variable is compared to maximum velocity constant. If it is greater, then block 326 is executed, which limits the value of the non-limited velocity variable to the value of the maximum velocity while preserving the variable's original sign, which is used to determine direction of travel. The tape transport has a maximum velocity. This tends to be the same value in both directions. The next block is 238. If the non-limited velocity was not greater than the maximum value constant, then block 238 is also the next block.

In block 328, a distance is calculated in which the tape transport, accelerating the tape at maximum acceleration, can return to the current velocity, if it was given the current velocity as the intermediate velocity. This distance is stored in a response limit distance variable. Because the acceleration of the transport is a fixed number, the only variable in the calculation is the current velocity. The maximum acceleration constant is divided by the current velocity. This calculation is performed as part of the steps necessary to prevent overshoot.

Next, in block 330, the response limit distance variable is subtracted from the detected distance variable. In the next block, block 332, a velocity is selected for this difference, just as it was selected for the detected distance. This velocity is stored in a response limit velocity variable. If the response limit velocity is greater than the non-limited velocity, then an overshoot will occur if the non-limited velocity is output as the intermediate velocity. This comparison is performed in block 334 of FIG. 17, and if the non-limited velocity is greater, then block 336 is branched to, and if it is less or equal, then block 338 is branched to.

In block 336, the current velocity is outputted as the intermediate velocity value and in block 338, the non-limited velocity is outputted as the intermediate velocity. After either of these blocks, block 340 is executed.

Block 340 checks whether the positioning is completed by checking to see if the detected distance is zero, and whether the current velocity is equal to the desired velocity. If both are true, block 342 is branched to, which is the end box and control of the transport is passed to other software. If these conditions are not met, then block 302 is branched to, and the procedure is repeated until the conditions are met.

In summary, the present invention provides a technique for cueing a particular cue location, such as the beginning of a certain frame, to the scanner on the tape transport, at a selectable desire velocity. Additionally, the cue location on the video tape that is being positioned can be advanced at the rate of the desired velocity to allow a synchronous cueing ability at an arbitrary velocity.

While the present invention has been described in terms of a video tape recorder, it will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the appended claims rather than the foregoing description, and all changes that come within the meaning and range of equivalents thereof are intended to be embraced therein.

I claim:

1. Apparatus for positioning a location on a tape to a desired position which is continuously changing during a location positioning operation with a selectable desired velocity, wherein the continuously changing desired position is separated by a detectable distance from a current position, comprising:

means for generating a detected distance signal indicative of the detected distance between the current position and the desired position which is continuously changing at the rate of the desired velocity from a desired time during the location positioning operation;

means for supplying a current velocity signal indicative of a current velocity of the tape;

means for providing a desired velocity signal indicative of the desired velocity of the tape at the continuously changing desired position;

means responsive to the desired velocity signal and the detected distance signal, for producing an intermediate velocity signal indicative of an intermediate velocity at which the tape presently is moved to achieve the desired velocity at the continuously changing desired position; and means responsive to the intermediate velocity signal for adjusting the current velocity of the tape to that of the intermediate velocity.

2. Apparatus of claim 1 wherein the means for providing a desired velocity signal comprises:

means for providing an operator velocity selection indicating the desired velocity; and means responsive to the operator velocity selection for generating the desired velocity signal.

3. Apparatus of claim 1 wherein the means for adjusting the current velocity of the tape comprises:

means responsive to the current velocity signal and the intermediate velocity signal for generating a velocity error signal indicating the difference between the current velocity signal and the intermediate velocity signal; and means for adjusting the current velocity to minimize the velocity error signal.

4. Apparatus of claim 1 further comprising:

means for providing a framing signal indicative of a selected frame; and means responsive to said framing signal for generating framed detected distance signal indicating the remainder of the detected distance signal divided by the framing signal and providing the framed detected distance signal to the means for selecting an intermediate velocity as the detected distance signal.

5. Apparatus of claim 1 wherein the means for generating the detected distance signal comprises:

means for generating a current position signal indicative of the current position;

means for generating a desired position signal indicative of the continuously changing desired position; and means responsive to the current position signal and the desired position signal for generating a detected distance signal indicative of the distance separating the current position and the continuously changing desired position.

6. Apparatus of claim 5 wherein the means for generating the current position signal comprises:

means for generating a first signal indicating the current position according to one of a plurality of periodic location indicators located contiguously with the tape;

means for generating a second signal, independently of the periodic location indicators, indicating the distance between the current position and the one of the periodic location indicators; and said means for generating the current position signal being responsive to the first signal and the second signal.

7. Apparatus of claim 5 wherein the means for generating a desired position signal comprises:

means for providing an operator position selection indicating the continuously changing desired position; and means responsive to the operator position selection for generating the desired position signal.

8. Apparatus of claim 5 wherein the means for generating the current position signal comprises:

means for detecting a periodic location indicator located contiguously with the tape at the current position; and means responsive to the periodic location indicator for generating the current position signal.

9. Apparatus of claim 8 wherein the periodic location indicator is time code information.

10. Apparatus of claim 8 wherein the periodic location indicator is control track information.

11. Apparatus of claim 1 wherein the means for generating comprises;

means responsive to the desired position, the desired velocity and the desired time, for generating a current desired position indicative of the desired position changed at a rate of the desired velocity from the desired time to present; and means for detecting the distance separating the current position and the current desired position and generating a detected distance signal indicative of the detected distance.

12. Apparatus of claim 11 wherein the means for selecting an intermediate velocity comprises means responsive to the detected distance signal for selecting the intermediate velocity from a look-up table of values.

13. Apparatus of claim 11 wherein the means for selecting a terminal intermediate velocity comprises means responsive to detected distance signal for generating the terminal intermediate velocity according to a velocity/distance profile implemented as a mathematical expression calculated by a computer means.

14. Apparatus of claim 11 wherein there is a maximum velocity at which the tape can be transported and the means for adding the intermediate velocity signal and the desired velocity signal comprises:

means responsive to the desired velocity signal and the intermediate velocity for adding the intermediate velocity signal and the desired velocity signal to generate an absolute intermediate velocity signal; and means responsive to the absolute intermediate velocity signal for limiting the absolute intermediate velocity to the maximum velocity to generate the intermediate velocity signal.

15. Apparatus of claim 11 wherein the means for generating a current desired position comprises:

means responsive to the desired velocity signal and the desired time for generating a positional reference that changes at a rate of the desired velocity from the desired time to present; and means responsive to the desired position and positional reference for generating the current desired position.

16. Apparatus of claim 11 wherein the means for generating a current desired position comprises:

means responsive to the desired velocity signal for generating a clock signal at a rate of the desired velocity; and means responsive to the desired position, the desired time and the clock signal for generating the current desired position.

17. Apparatus of claim 16 wherein the means responsive to the desired position, the desired time and the clock signal, for generating the current desired position comprises a counter which is preset to the current desired position and starts to count from the desired time at a rate determined by the clock signal.

18. Apparatus for transporting a tape along a path from a current position at a current velocity, to achieve a desired velocity at a desired position, wherein the desired position is changed from a desired time in response to the desired velocity, comprising:

means for generating a current velocity signal indicative of current velocity;

means for generating a desired velocity signal indicative of the desired velocity;

means responsive to the desired position, the desired velocity and the desired time, for generating a current desired position signal indicative of the desired position changed via the desired velocity;

means for detecting the distance between the current position and current desired position and generating distance signal indicative of said distance;

means responsive to the desired velocity signal and the distance signal for generating an intermediate velocity signal indicative of a presently desired velocity;

means responsive to said intermediate velocity signal and said current velocity signal for producing a velocity error signal; and means for adjusting the current velocity in response to said velocity error signal.

19. Apparatus for transporting a tape along a path to synchronize the transport of a location on the tape transported at a current velocity from a current position, with a selectable desired velocity at a desired time from a desired position along the path of the tape separated by a detectable distance from the current position, the apparatus comprising:

means responsive to the desired position, the desired velocity and the desired time for generating a current desired position indicative of the desired position changed at a rate of the desired velocity from the desired time to present;

means for detecting the distance separating the current position and the current desired position and generating a detected distance signal indicative of the detected distance;

means for detecting the current velocity of transport of the tape and generating a current velocity signal indicative of the current velocity;

means for selecting the desired velocity for transport of the tape and generating a desired velocity signal indicative of the desired velocity;

means responsive to the desired velocity signal and the detected distance signal for selecting an intermediate velocity at which the tape must presently be transported to synchronize the transport of the location on the tape with the desired velocity from the desired time at the desired position and generating an intermediate velocity signal indicative of the intermediate velocity; and means responsive to the current velocity signal and the intermediate velocity signal for adjusting the current velocity of the transport of the tape to the intermediate velocity.

20. Apparatus of claim 19 wherein the means for generating a current desired position comprises:

means responsive to the desired velocity signal and the desired time for generating a positional reference that changes at a rate of the desired velocity from the desired time to present; and means responsive to the desired position and positional reference for generating the current desired position.

21. Apparatus of claim 19 wherein the means for generating a current desired position comprises:

means responsive to the desired velocity signal for generating a clock signal at a rate of the desired velocity; and means responsive to the desired position, the desired time and the clock signal for generating the current desired position.

22. Apparatus of claim 21 wherein the means for generating a clock signal comprises a frequency generator.

23. Apparatus of claim 21 wherein the means responsive to the desired position, the desired time and the clock signal for generating the current desired position comprises a counter which is preset to the current desired position and starts to count from the desired time at a rate determined by the clock signal.

24. Method of transporting a tape along a path to position a location on the tape transported at a current velocity from a current position, to achieve a selectable desired velocity at a desired position along the path separated by a detectable distance from the current position, wherein the desired position is changed at the rate of the desired velocity from a desired time, comprising:

generating a current desired position indicative of the desired position changed at a rate of the desired velocity from the desired time to present in response to the desired position, the desired velocity and the desired time;

detecting the distance separating the current position and the current desired position and generating a detected distance signal indicative of the detected distance;

detecting the current velocity and generating a current velocity signal indicative of the current velocity;

selecting the desired velocity and generating a desired velocity signal indicative of the desired velocity;

selecting an intermediate velocity, in response to the desired velocity signal and the detected distance signal, at which the tape must presently be transported to achieve the desired velocity at the desired position and generating an intermediate velocity signal indicative of the intermediate velocity; and adjusting the current velocity of the tape to the intermediate velocity in response to the current velocity signal and the intermediate velocity signal.

25. Method of claim 24 wherein the step of selecting the desired velocity and generating a desired velocity signal comprises the steps of:

receiving an operator velocity selection indicating the desired velocity; and generating the desired velocity signal in response to the operator velocity selection.

26. Method of transporting a tape along a path from a current position at a current velocity, to achieve a selected velocity at a desired changing position separated by a detectable distance from the current position, comprising:

determining a current desired position indicative of the desired position changed at a rate of the selected velocity from a desired time to present, in response to the desired position, the selected velocity and the desired time;

determining a detected distance between the current position and the current desired position;

generating an intermediate velocity indicative of a presently desired velocity, in response to the selected velocity and the detected distance;

producing a velocity error in response to said intermediate velocity and said current velocity; and adjusting the current velocity in response to said velocity error.

* * * * *